L. BOIRAULT.
ELECTRICAL COUPLING DEVICE FOR RAILWAY AND OTHER VEHICLES.
APPLICATION FILED JAN. 21, 1914.
1,216,057.
Patented Feb. 13, 1917.
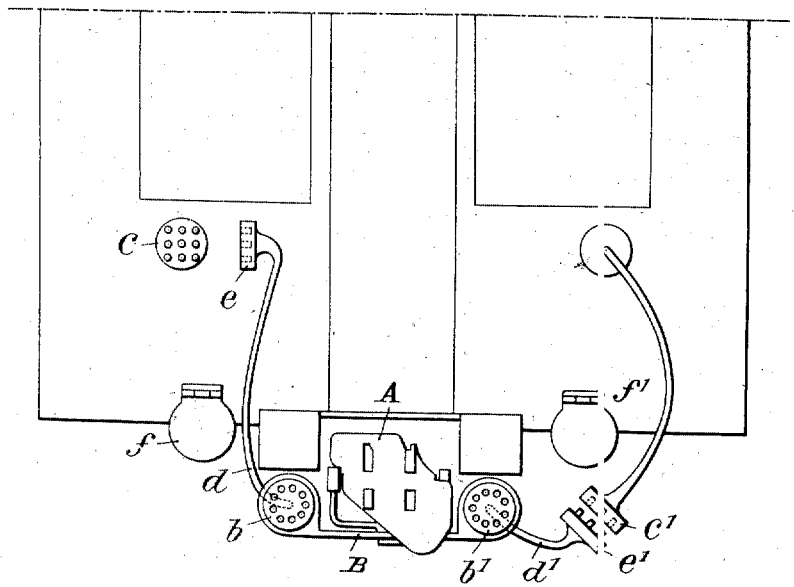
WITNESES
INVENTOR
LOUIS BOIRAULT
ATTORNEYS

UNITED STATES PATENT OFFICE.

LOUIS BOIRAULT, OF PARIS, FRANCE.

ELECTRICAL COUPLING DEVICE FOR RAILWAY AND OTHER VEHICLES.

1,216,057.  Specification of Letters Patent.  Patented Feb. 13, 1917.

Original application filed July 25, 1913, Serial No. 781,213. Divided and this application filed January 21, 1914. Serial No. 813,416.

*To all whom it may concern:*

Be it known that I, LOUIS BOIRAULT, a citizen of the Republic of France, residing at Paris, 58 Rue Taitbout, in the Republic of France, engineer, have invented certain new and useful Improvements in Electrical Coupling Devices for Railway and other Vehicles, of which the following is a specification.

This application is a division of the application filed July 25, 1913, Serial No. 781,213.

This invention relates to improvements in electric coupling devices, for use in connection with electric conduits on the separate vehicles of a train, and relates more particularly to the case where the train comprises vehicles provided with automatic electric coupling apparatus operative by the mere approaching of the vehicles, as well as carriages not provided with automatic electric coupling apparatus, and merely having connectors of the usual type intended to be coupled by hand with similar connectors on another vehicle.

According to this invention, each vehicle provided with an automatic electric coupling, is also provided with connectors of the usual type intended to be coupled by hand with similar connectors provided on another vehicle, and with two flexible cables which are secured to the male and female portions of the automatic connector the movable ends of which connectors are provided with electric connectors adapted to be coupled to corresponding connectors of the usual kind provided on the same vehicle.

When two vehicles to be coupled are both provided with automatic couplings, the latter will be already connected to connectors of the usual kind on the respective vehicles by means of flexible cables secured to the male and female portions of the automatic couplings, so that the connections between the two vehicles will be established automatically as soon as they are pushed against each other.

The accompanying drawing illustrates diagrammatically by way of example, one end of a vehicle provided with a connector of the usual kind, and with an automatic coupling.

A designates an automatic coupling device serving for the automatic coupling of the vehicles and carrying an electric connector B the latter being adapted to be coupled automatically with a similar connector on the other vehicle. These automatic electric connectors may, for example, be of the kind described in British Patent No. 13820 of 1913. They comprise male and female connecting members $b$ and $b'$ located symmetrically on the sides of the coupling A.

The vehicle is also provided with connectors $c$, $c'$ of the usual kind, intended to be coupled by hand with similar connectors on another vehicle.

According to the present invention, two flexible cables $d$, $d'$ are secured respectively to the male and female portions $b$, $b'$ and carry at their free ends connectors $e$, $e'$ adapted to be coupled with the connectors $c$, $c'$ of the usual kind placed on the same vehicle.

When the two vehicles to be coupled are both provided with automatic connectors B, their connectors $e$, $e'$ are previously connected with the connectors $c$, $c'$, respectively. After the connectors $e$, $e'$ and $c$, $c'$ are coupled, the connectors $b$ and $b'$ of each vehicle are coupled with those $b$ and $b'$, respectively of the other vehicle so that the electric circuit is established through $c$ $e$ $d$ $b$ $b'$ $d'$ $e'$ $c'$.

In the case where the vehicle is to be coupled to another vehicle not provided with an automatic connector, the connectors $e$, $e'$ and $c$, $c'$ are disengaged and connectors $e$, $e'$ inclosed respectively in protecting boxes $f$ and $f'$ mounted on the upper part of the vehicle on the frame, or on the coupling apparatus. When the vehicles are coupled, the connectors $c$, $c'$ of each vehicle are coupled by hand in the usual manner to the connectors $c'$, $c$, respectively, on the other vehicle.

It must be understood that this arrangement of the cables and of the connectors may be adapted to any construction of electric connecting apparatus.

Claims:

1. In an electric railway vehicle, the combination of hand connectors secured to the body of the vehicle and adapted to be engaged by connectors on another vehicle, a vehicle coupling apparatus, automatic connectors secured to the sides of such coupling apparatus, hand connectors adapted to be coupled with the said hand connectors secured to the body of the vehicle, and cables connecting such hand connectors with the said automatic connectors.

2. In an electric railway vehicle, hand connectors, one secured to the vehicle and the other to a cable secured to the vehicle, a coupling device carrying electric conductors and adapted to be automatically coupled with similar connectors on another vehicle, and hand connectors connected with the connectors of the coupling device and adapted to be coupled with the first named connectors.

In testimony, that I claim the foregoing as my invention I have signed my name in presence of two subscribing witnesses.

LOUIS BOIRAULT.

Witnesses:
HANSON C. COXE,
MAURICE ROUX.